United States Patent [19]
Andersson et al.

[11] Patent Number: 5,666,389
[45] Date of Patent: Sep. 9, 1997

[54] FUEL ASSEMBLY AND SPACER FOR A NUCLEAR REACTOR

[75] Inventors: Ingmar Andersson; Mahdi Majed, both of Västerås, Sweden; Clas-Göran Wiktor, Dietlikon, Switzerland; Dietmar Wolfram, Eskilstuna, Sweden

[73] Assignee: ABB Atom AB, Västerås, Sweden

[21] Appl. No.: 329,410

[22] Filed: Oct. 27, 1994

[30] Foreign Application Priority Data

Nov. 2, 1993 [SE] Sweden .................................. 9303583

[51] Int. Cl.⁶ .................................................. G21C 3/34
[52] U.S. Cl. .................. 376/462; 376/438; 376/457; 376/442; 376/443; 376/439; 376/448; 376/445
[58] Field of Search ............................. 376/462, 438, 376/457, 442, 443, 439, 448, 445; 976/DIG. 73, DIG. 75, DIG. 77, DIG. 81; 420/422

[56] References Cited

U.S. PATENT DOCUMENTS

| | | | |
|---|---|---|---|
| 3,762,996 | 10/1973 | Milburn et al. | 376/442 |
| 3,944,467 | 3/1976 | Biermann et al. | 376/442 |
| 4,312,706 | 1/1982 | Snyder, Jr. et al. | 376/442 |
| 4,396,573 | 8/1983 | Fevtrel | 376/442 |
| 5,247,551 | 9/1993 | Van Swam | 376/441 |
| 5,278,883 | 1/1994 | Patterson et al. | 376/439 |
| 5,285,487 | 2/1994 | Mansson et al. | 376/438 |
| 5,303,276 | 4/1994 | DeMario et al. | 376/442 |

FOREIGN PATENT DOCUMENTS 467047  9/1991  Sweden .

Primary Examiner—Charles T. Jordan
Assistant Examiner—Meena Chelliah
Attorney, Agent, or Firm—Watson Cole Stevens Davis, P.L.L.C.

[57] ABSTRACT

The invention relates to a fuel assembly (1) and a spacer (7) for a nuclear reactor wherein the spacer comprises a plurality of cells (9) for retaining and mutually fixing parallel elongated elements (3, 8) extending through the cells to form a bundle in the fuel assembly. The cells are tubular and internally provided with four elongated, non-independently resilient supports (10), formed in the sleeve material, or with two elongated, non-independently resilient supports (10), formed in the sleeve material, and two independently resilient supports (16), wherein the supports are intended to provide an all-sided positioning of the elongated element. (FIG. 2)

14 Claims, 3 Drawing Sheets

Fig. 2
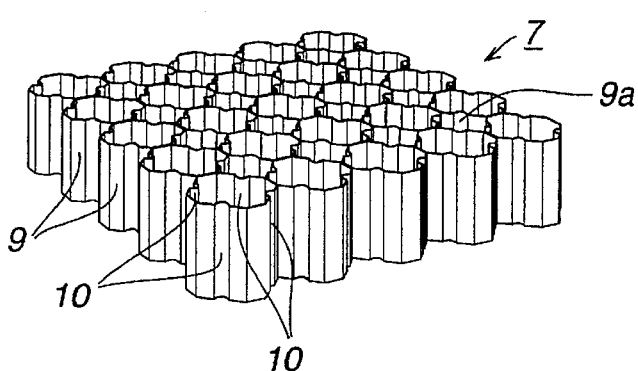
Fig. 3
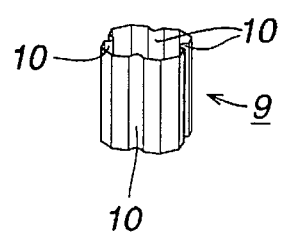
Fig. 4a
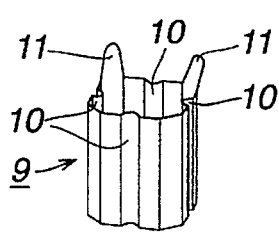
Fig. 4b    Fig. 4c
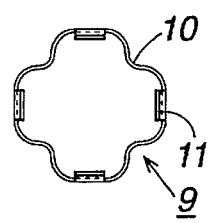 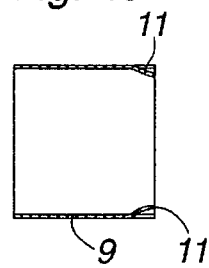
Fig. 4d    Fig. 4e    Fig. 4f    Fig. 4g
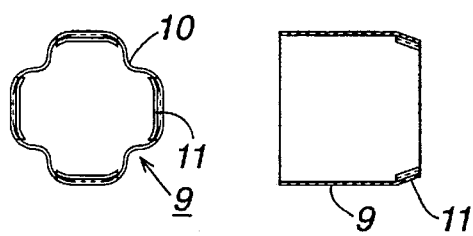 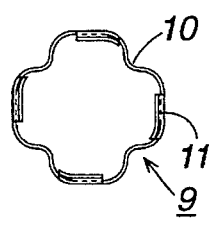 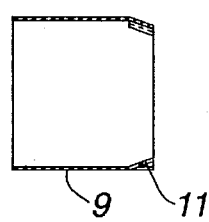
Fig. 4h    Fig. 4i    Fig. 4j    Fig. 4k
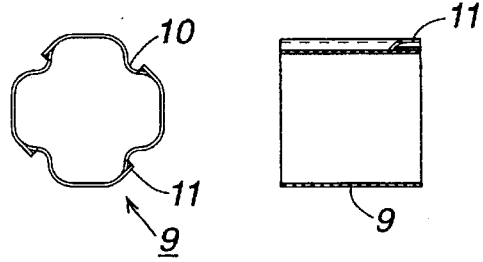 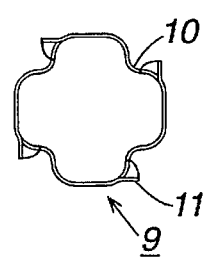 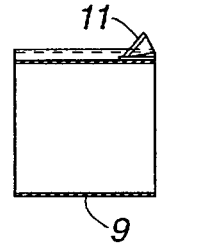

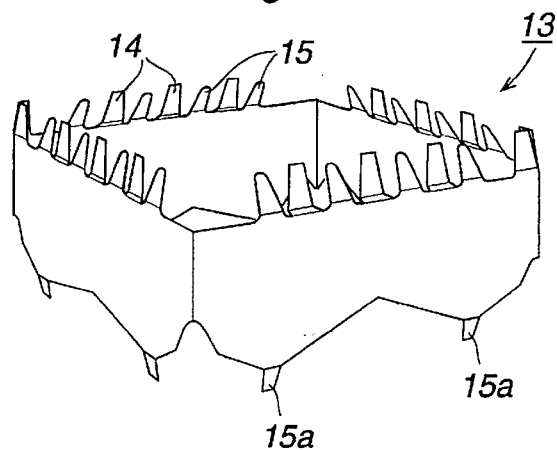
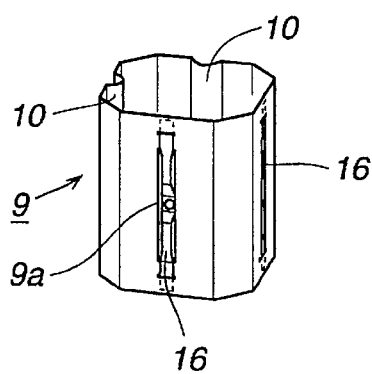 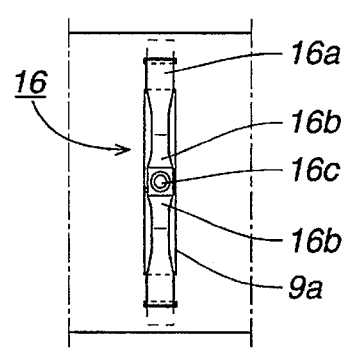 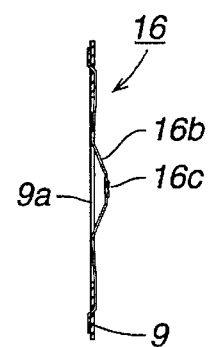
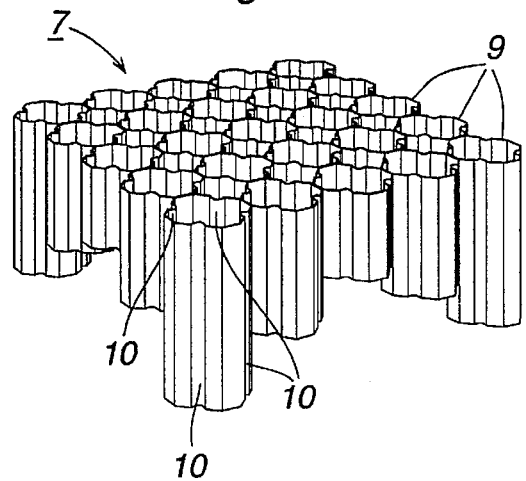

FUEL ASSEMBLY AND SPACER FOR A NUCLEAR REACTOR

TECHNICAL FIELD

The present invention relates to a fuel assembly and a spacer for a light-water nuclear reactor, more particularly of boiling-water type. The fuel assembly comprises a bundle of elongated fuel rods retained and fixed by a plurality of spacers arranged in spaced relationship to each other along the bundle. The spacers comprise a plurality of cells to mutually fix the fuel rods. A coolant, for example water, is adapted to flow from below and up through the normally vertically arranged fuel assembly and, during a nuclear reaction, to cool the fuel rods arranged in the assembly.

BACKGROUND ART, PROBLEMS

A fuel assembly in a boiling water nuclear reactor includes an elongated tubular container, often with a rectangular or square cross section, which is open at both ends forming a continuous flow passage, through which the coolant of the reactor is able to flow. The fuel assembly comprises a large number of also elongated tubular fuel rods, arranged in parallel in a certain definite, normally symmetrical pattern. At the top, the fuel rods are retained by a top tie plate and at the bottom by a bottom tie plate. To allow coolant in the desired manner to flow past the fuel rods, it is important that these be kept at a distance from each other and prevented from bending or vibrating when the reactor is in operation. For this purpose, a plurality of spacers are used, distributed along the fuel assembly in the longitudinal direction.

When coolant flows upwards through the core, the flow induces force components which influence the fuel rods in a horizontal direction such that these start vibrating. These vibrations may give rise to abrasion damage on the rods. The abrasion damage occurs primarily at those points where the rods make contact with the internal fixed or resilient support of the spacer cell. In difficult cases, the abrasion may cause penetration of the fuel rod, allowing fissile material to pass out into the core.

It is known to increase the margin with respect to abrasion by reducing the distance between the spacers. This, however, causes another problem, namely, that the spacers must not have such a high individual flow resistance that the total pressure drop exceeds a predetermined value during the passage of the coolant through the fuel assembly.

The design of spacers means that contradictory requirements must be taken into consideration. On the one hand, the spacer shall be sufficiently strong to reduce the deflection and vibration of the fuel rods and to resist great thermal and hydraulic forces. It must provide a sufficient contact surface with the fuel rods to minimize local wear on the fuel rods at the contact points. It must be able to withstand swelling of the fuel rods. On the other hand, the spacer shall be designed with a minimum amount of material to minimize the neutron-absorbing effect. It shall be designed so as to provide a minimum flow resistance and the material from which it is manufactured shall be low-absorbing, for example zirconium.

Another important factor when designing a spacer for a boiling water reactor is to ensure that the spacer effects a good cooling of the fuel rods by a suitable mixing of the coolant. In those cases where the cooling is not sufficient, so-called dryout may arise. In serious cases, dryout gives rise to penetration of the fuel rods.

The smallest permissible dryout margin during stationary reactor operation shall have a value which involves an acceptably small risk of fuel damage caused by dryout both during normal operation and expected transients.

The spacers thus influence the flow of the coolant and hence the cooling of the fuel. It is known that in a region immediately below the spacer, where the coolant has not yet passed the spacer, a deterioration takes place of the coolant film on the fuel rods, whereas in a region above the spacer, where coolant has just passed the spacer, a reinforcement of the water film instead takes place. The reinforcement of the coolant film is due to the turbulence which arises in the coolant when it passes a spacer. The greatest risk of dryout arises in the upper part of the fuel immediately below the spacers.

Known spacers often comprise a lattice of plate bands arranged crosswise and standing on end, these plate bands forming substantially square cells. Inside the cells there are usually arranged fixed and/or resilient supports for all-sided positioning of the fuel rods or the control rod guide tubes extending through the cells. It is known to design spacers for boiling water reactors with a lattice comprised of sleeves, where the sleeves, for example, are made of one or more materials with different spring rates. A lattice of two materials is shown in Swedish patent specification 469 047. A lattice comprised of sleeves provides more favourable cooling conditions than a lattice comprised of plate bands in that the sleeves are given an at least substantially circular shape which can better conform to the normally circular fuel rods. The better cooling properties are due to the fact that water tends to accumulate where the plate bands cross each other, that is, between the rods and at a distance therefrom, whereas in case of sleeve cells the water accumulates at the walls of the sleeve which are arranged nearer the fuel rods whereby the water can be utilized in a better way.

Another disadvantage of spacers with lattices of plate bands is that they are expensive and complicated to manufacture.

In CH 460 965, FIG. 8, a sleeve spacer is shown which has elongated embossments arranged at the corners of the sleeve. The shape of the sleeve with six wall parts means that when the sleeve is arranged in a hexagonal lattice, the wall parts will make close contact with each other except where the walls are provided with the embossments. This in turn means that the resilient property of the sleeve is limited to the resilience in the very embossment. The disadvantage of this embodiment is that only the resilience in the very embossment is to accumulate the forces which arise in rods and spacers.

Known spacers are often made completely or partially of Inconel which is a material with good strength and good properties with regard to machining when manufacturing spacers. However, it is desirable to manufacture spacers of a material with lower ability to absorb neutrons, that is, a low-absorbing material, for example a zirconium alloy. Spacers of zirconium alloy are an advantage from the point of view of reactivity economy. In addition, spacers of a low-absorbing material are less radioactive after irradiation, which is an advantage when handling the spacers after reactor operation.

One difficulty with zirconium alloys is that the material relaxes upon irradiation, which involves a considerable reduction of the spring constant in a short time. The fixed supports according to the prior art are usually designed with point contact with the fuel rod or with line contact which extends over a minor part of the height of the spacer. Point contact is unfavourable from the point of view of abrasion.

The fixed supports are usually supplemented by one or more resilient supports for all-sided positioning of the fuel rods extending through the cells.

The object of the invention is to provide a spacer which has a good margin with respect to abrasion, which achieves good cooling, and which is simple to manufacture and, in addition, is possible to manufacture of zirconium alloy.

SUMMARY OF THE INVENTION

The present invention relates to a fuel assembly and a spacer completely or partially made of zirconium alloy for a nuclear reactor wherein the spacer comprises an orthogonal lattice of sleeves and wherein each sleeve positions an elongated element, for example a fuel rod or a control rod guide tube, extending through the sleeve, and wherein flow channels are formed between the sleeves. The sleeves are tubular and internally provided with four, more or less elongated supports. All the supports are arranged in the wall material of the sleeve and in a direction parallel to the longitudinal direction of the elongated element as an elongated embossment with a cup-shaped cross section facing the centre of the sleeve. The supports are arranged evenly distributed along the circumference of the sleeve, preferably with an angular pitch of 90°. The supports in themselves are not resilient but together with the sleeve they form a resilient unit by allowing the embossment together with that wall part of the sleeve which faces outwards towards the flow channel to be resilient outwards into the flow channel. The supports extend preferably along the entire length of the sleeve.

The internal supports may alternatively include four supports, of which at least two are designed as independently resilient supports and at least one comprises a support in the form of an elongated embossment such that four supports give an all-sided positioning of the elongated element. The independently resilient supports are most advantageously made of a material which is more resilient than the sleeve material. The sleeve material may, for example, be made of a zirconium alloy.

The embossment constitutes a support intended to make contact with the elongated element inserted into the sleeve. The elongated contact surface reduces the risk of abrasion in the spacer since the elongated element is prevented from vibrating therein compared with a support with point contact or a short contact length.

The shape of the sleeves admits a simple manufacturing process. During manufacture of the sleeves, the sleeves are divided, in suitable lengths, from an elongated tube whereupon the embossments are formed by an internal mandrel and an external tool. The embossed pieces of tubing, the sleeves, are then joined together in a lattice, for example by means of spot welding.

The spacer can be designed with different sleeve lengths. It is particularly advantageous to provide the lower part of the spacer, that is, the flow inlet of the spacer, with differentiated sleeve lengths such that the coolant encounters the spacers at different planes depending on where in the cross section of the fuel assembly the coolant flows. The sleeves are divided into at least two groups, preferably three, where the sleeves within one group have the same length but where the different groups comprise sleeves of different length. The groups are adapted to comprise sleeves at the periphery of the spacer and sleeves in the central part of the spacer, and possibly sleeves arranged between the periphery and the central part. The lengths of the groups are differentiated most advantageously such that the upwardly flowing medium first reaches the groups which is arranged nearest the periphery of the spacer, and last the group which is arranged in the central part of the spacer, and possibly therebetween the group which is formed between the central part of the spacer and the peripheral part thereof.

It is advantageous to differentiate the sleeve lengths of the spacers at the inlet of the coolant since this counteracts that the coolant at the inlet, because of great hydraulic forces, destroys the coolant film around the elongated elements. When rods with a greater risk of vibration, relatively seen, in one bundle are provided with the longer sleeves, this produces a positive effect on the abrasion margin.

The outlet of the spacer cells are advantageously arranged in the same plane to achieve a good turbulence of the coolant.

The individual spacer cells may be provided with one or more mixing fins for creating turbulence and hence improved cooling of the fuel rods. The mixing fins are arranged at the upper edge of the cell, arranged in the fuel assembly, in the form of lugs projecting from the upper edge and bent towards or away from the centre of the cell, or in the form of tabs punched out of the wall material of the cell, or bent in a direction toward or away from the centre of the cell.

Each spacer may be provided with conventional structural parts such as a four-sided frame or skirt surrounding the entire bundle.

The advantage of the invention is that the individual sleeves are simple to manufacture since the supports for fixing the elongated element in the cells of the lattice are integrated into the wall material of the sleeve.

The shape of the support of the sleeve in the form of elongated embossments admits a large contact surface with respect to the fuel rod, which reduces the risk of vibrations and the abrasion damage connected therewith. In those cases where the sleeve material is not penetrated, a vibration-causing cross-flow of the coolant in the spacer is prevented.

The sleeve has a small cross section in the direction of flow, which constitutes an extremely small flow resistance and hence only gives rise to a low pressure drop. The low pressure drop permits the spacers to be arranged more closely together in the fuel assembly compared with conventional spacers, which further reduces the risk of vibration and abrasion damage while at the same time improving the cooling. In addition, the weight of the fuel rod bundle per spacer becomes lower, which is particularly advantageous when transporting fuel rod bundles to and from reactor plants.

Another advantage of our invention is that the embossment together with part of the sleeve wall is allowed to be resilient outwardly into the flow channel and hence achieve a relatively long resilient path. The long resilient path may be combined with a small wall thickness which, in turn, is made possible by the use of a zirconium alloy. A small wall thickness, in turn, gives rise to a small pressure drop, which is extremely important, especially for boiling water reactors.

A reduced risk of abrasion is thus obtained primarily due to the following factors:

The long contact surface between the internal supports of the sleeve and the fuel rods reduces the risk of vibration.

In those cases where the sleeve material is not penetrated, cross-flows in the spacer are prevented, which reduces the risk of vibrations.

The spacer gives rise to a low pressure drop by the small cross section of the sleeve material in the flow direction, whereby the spacers can be arranged more closely together along the bundle and thus provide better support for the rods such that the risk of these starting to vibrate is reduced.

The spacer according to the invention is simple to manufacture and all the sleeves included can be formed identical, possibly with differentiated lengths.

BRIEF DESCRIPTION OF THE DRAWINGS

The invention will be most readily understood with reference to the accompanying drawings.

FIG. 2 is a perspective view of a spacer according to the invention.

FIG. 3 is a perspective view of an embodiment of a sleeve for a spacer according to the invention, the sleeve comprising four internal supports.

FIGS. 4a–k show an embodiment of a sleeve for a spacer, the sleeve being provided with alternative embodiments of mixing fins. FIG. 4a is a perspective view. FIGS. 4b, 4d, 4f, 4h, 4j are top plan views, and FIGS. 4c, 4e, 4g, 4i, 4k are vertical sectional views.

FIG. 5 is a perspective view of a skirt intended to surround a spacer according to the invention.

FIG. 6a is a perspective view a further embodiment of a sleeve for a spacer according to the invention, the sleeve comprising two independently resilient supports.

FIG. 6b is a side view the resilient support of the FIG. 6a sleeve.

FIG. 6c is a vertical sectional view of the resilient support of FIG. 6b.

FIG. 7 is a perspective view of a spacer according to the invention, the sleeves of which at the lower edge of the spacer having different lengths.

DESCRIPTION OF THE PREFERRED EMBODIMENTS

Figure 1:
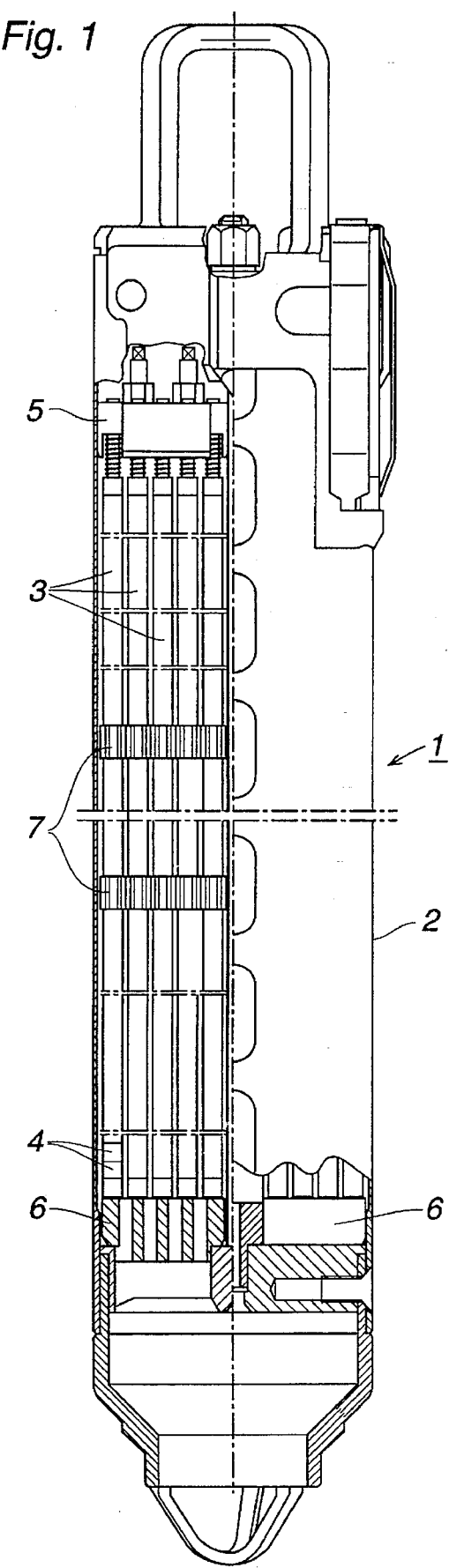
FIG. 1 shows a boiling water fuel assembly partly broken away and partly in section with spacers according to the invention.

FIG. 1 shows a boiling water fuel assembly 1 which comprises an elongated tubular container, of rectangular cross section, referred to as a fuel channel 2. The fuel channel 2 is open at both ends so as to form a continuous flow passage through which the coolant of the reactor flows. The fuel assembly 1 comprises a large number of also elongated tubular fuel rods 3, arranged in parallel in a bundle, in which pellets 4 of nuclear fuel are arranged. The fuel rods 3 are retained at the top by a top tie plate 5 and at the bottom by a bottom tie plate 6. The fuel rods 3 are kept spaced from each other by means of spacers 7 and are prevented from bending or vibrating when the reactor is in operation.

FIG. 2 shows a spacer 7 with an orthogonal lattice comprising sleeves 9, in which each sleeve 9 is intended to position an elongated element, for example a fuel rod 3 or a control rod guide tube (not shown), extending through the sleeve. Between the sleeves 9, flow channels 9a are formed.

FIG. 3 shows a sleeve 9 intended to be joined to other identical sleeves 9 to form a lattice according to FIG. 2. The sleeve 9 is tubular and is internally provided with four supports. The supports comprise elongated embossments 10 facing the centre of the sleeve 9, which provide an all-sided positioning of the elongated element 3. The supports are arranged evenly distributed along the circumference of the sleeve 9 with a 90° pitch angle. The supports extend along the length of the entire sleeve 9.

FIG. 4a shows a sleeve 9 which is provided with two mixing fins 11 formed as lugs extending from the upper edge of the sleeve 9 and angled outwards from the centre of the sleeve 9 to achieve turbulence in the coolant flowing past to improve the cooling properties.

FIGS. 4b, 4c show a sleeve 9 with mixing fins 11 in the form of tabs punched out of the wall material of the sleeve 9, these tabs being bent along an axis perpendicular to the longitudinal axis of the sleeve 9 and inwards towards the centre thereof. The mixing fins 11 are arranged centrally in those surfaces of the sleeve 9 which in a spacer lattice are facing adjacent sleeves 9.

FIGS. 4d, 4e show a sleeve 9 with mixing fins 11 of the same type as in FIGS. 4b, 4c but with a greater extent in a direction across the longitudinal axis of the sleeve 9.

FIGS. 4f, 4g show a sleeve with mixing fins 11 of the same type as shown in FIGS. 4d, 4e but displaced in the lateral direction.

FIGS. 4h, 4i and 4j, 4k show sleeves 9 with mixing fins 11 arranged in a part of the embossed surface 10 in the sleeve 9. The mixing fins 11 are bent around an axis at a certain angle to the longitudinal axis of the sleeve 9 and outwards from the centre of the sleeve 9.

The sleeves 9 according to FIGS. 4a–k may be provided with one or more of the shown mixing fins 11 which may be made with a straight or a bent shape. A sleeve 9 may also be provided with combinations of different types of mixing fins 11.

The embodiments according to FIGS. 4b–4k are especially advantageous from the manufacturing point of view. They are also advantageous from the assembly point of view since this type of mixing fins 11 are less sensitive to damage.

In FIG. 4 all the mixing fins 11 are shown to be arranged at the upper edge of the sleeve 9; however, corresponding fins may be arranged arbitrarily in the sleeve, for example in the middle of or at the lower edge thereof.

FIG. 5 shows a skirt 13 designed as a part suspended underneath the sleeves 9, where the upper part of the skirt 13 is fixed to the lower edge of the sleeves 9 adjoining the skirt 13. The upper part of the skirt 13 is provided with a plurality of lugs 14 intended to be fixed to the sleeves 9. The lugs 14 extend in the direction of flow and are somewhat bent inwards towards the central part of the skirt 13. The upper part of the skirt 13 is also provided with a number of fins 15 intended to guide coolant, flowing through the fuel assembly 1, towards the central parts of the bundle. The lower edge of the skirt 13 is also provided with lugs 15a which are bent towards the central part of the skirt 13 and are intended to mechanically guide in the bundle when inserting/withdrawing it into/out of the fuel channel 2. It is suitable to construct the spacer skirt 13 of a zircaloy alloy.

FIG. 6a shows how the internal supports in a sleeve 9 may alternatively include two independently resilient supports 16 and two supports in the form of elongated embossments 10 for an all-sided positioning of the elongated element 3. The resilient supports 16 are most advantageously made from a material which is more resilient than the sleeve material. The resilient supports 16 are arranged adjacent to each other.

From FIGS. 6b, 6c it is clear that a resilient support 16 is formed as an elongated plate band 16a intended to be arranged in or above an opening 9a in the sleeve wall. The central part of the elongated plate band 16a is provided with a bulge 16b in which a recess 16c in the same direction as the bulge 16b is arranged, the recess 16c being intended to resiliently make contact with the elongated element 3 extending through the sleeve 9.

FIG. 7 shows a spacer 7, the lower part of which is characterized by a differentiated length of the sleeves 9. The sleeves 9 are divided into three groups, wherein the sleeves 9 within one group have the same length but wherein the different groups comprise sleeves 9 of different lengths. The groups are adapted to comprise sleeves 9 at the periphery of the spacer 7, sleeves 9 in the central part of the spacer 7, and sleeves 9 arranged between the periphery and the central part. The lengths of the groups are differentiated such that the upwardly flowing medium first reaches the group which is arranged nearest the periphery of the spacer 7, and last the group which is arranged in the central part of the spacer. The outlet of the spacer is arranged in one and the same plane.

We claim:

1. A spacer for retaining, at a plurality of levels, elongated fuel rods in a boiling water nuclear reactor, the spacer comprising an orthogonal lattice of cells through which the fuel rods extend, the cells being tubular and defining flow channels therebetween, each of the cells being of zirconium alloy and internally provided with four fixed elongated supports extending parallel to the longitudinal axis of each of the cells and facing the center of the cells for presenting an elongated surface contact with the rods extending therethrough and for providing an all-sided positioning of the rods, the supports comprising elongated embossments formed in the wall surfaces of the cells.

2. A spacer according to claim 1, wherein the embossments extend along the entire length of each of the cells.

3. A spacer according to claim 1, wherein the embossments are distributed with an angular pitch of 90° along the circumference of each of the cells.

4. A spacer according to claim 1, wherein the wall surface of each of the cells is broken.

5. A spacer according to claim 1, wherein the cells are divided into groups wherein the cells within one group have the same length along said longitudinal axis and the cells in different groups respectively have different lengths along said longitudinal axis.

6. A spacer according to claim 1, wherein each of the cells has a mixing fin comprising a lug extending from an edge of the cell and bent around an axis across the longitudinal direction of the cell and inwardly toward or outwardly from the center of the cell.

7. A spacer according to claim 1, wherein each of the cells has a mixing fin comprising a tab with a straight or bent shape punched out of the wall material of the cell and bent around an axis across the longitudinal axis of the cell, or bent at a predetermined angle to the longitudinal axis of the cell and inwardly toward or outwardly from the center of the cell.

8. A spacer for retaining, at a plurality of levels, elongated fuel rods in a boiling water nuclear reactor, the spacer comprising an orthogonal lattice of cells through which the fuel rods extend, the cells being tubular and defining flow channels therebetween, each of the cells being of zirconium alloy and internally provided with four fixed elongated supports extending parallel to the longitudinal axis of each of the cells and facing the center of the cells for presenting an elongated surface contact with the rods extending therethrough and for providing an all-sided positioning of the rods, at least one of the supports comprising elongated embossments formed in the wall surfaces of each of the cells, and at least two of the supports are independently resilient.

9. A spacer according to claim 8, wherein the independently resilient supports comprise a material which is more resilient than the cell material.

10. A spacer according to claim 8, wherein the supports are distributed with an angular pitch of 90° along the circumference of the cell.

11. A spacer according to claim 8, wherein said at least one support extends along the entire length of each of the cells.

12. A spacer according to claim 8, wherein the cells each include a mixing fin comprising a lug extending from an edge of the cell and bent around an axis across the longitudinal direction of the cell and inwardly toward or outwardly from the center centre of the cell.

13. A spacer according to claim 8, wherein the cells each include a mixing fin comprising a tab with a straight or bent shape punched out of the wall material of the cell and bent around an axis across the longitudinal axis of the cell, or bent at a predetermined angle to the longitudinal axis of the cell and inwardly toward or outwardly from the center of the cell.

14. A fuel assembly for a boiling water reactor with a bundle of elongated elements retained by a plurality of spacers arranged at spaced locations along the bundle, each of the spacers comprising a plurality of cells of zirconium alloy, the spacers comprising an orthogonal lattice of the cells through which the elements extend, the cells being tubular and defining flow channels therebetween, each of the cells being internally provided with four fixed elongated supports extending parallel to the longitudinal axis of each of the cells and facing the center of the cells for presenting an elongated surface contact surface with the elements extending therethrough and for providing an all-sided positioning of the rods, the supports comprising elongated embossments formed in the wall surfaces of each of the cells.

* * * * *